(12) United States Patent
Bermann et al.

(10) Patent No.: US 6,654,645 B2
(45) Date of Patent: Nov. 25, 2003

(54) CONTROL SYSTEM HAVING A PERSONAL COMPUTER TO CONTROL A PROCESS

(75) Inventors: Jürgen Bermann, Pfinztal-Berghausen (DE); Jens Hagen, Walldorf (DE)

(73) Assignee: Siemens Aktiengesellschaft, Munich (DE)

( * ) Notice: Subject to any disclaimer, the term of this patent is extended or adjusted under 35 U.S.C. 154(b) by 346 days.

(21) Appl. No.: 09/759,222

(22) Filed: Jan. 16, 2001

(65) Prior Publication Data

US 2002/0002406 A1 Jan. 3, 2002

Related U.S. Application Data

(63) Continuation of application No. PCT/DE99/02143, filed on Jul. 13, 1999.

(30) Foreign Application Priority Data

Jul. 13, 1998 (DE) .......................................... 198 31 405

(51) Int. Cl.⁷ .............................................. G05B 19/18
(52) U.S. Cl. .............................................. 700/4; 700/79
(58) Field of Search ............................... 700/1–2, 4–5, 700/7, 9, 19–20, 79, 82; 714/5, 162

(56) References Cited

U.S. PATENT DOCUMENTS 5,404,288 A    4/1995  McDunn et al. ............... 700/21

FOREIGN PATENT DOCUMENTS

| DE | 33 38 600 A1 | 5/1984 |
|---|---|---|
| DE | 38 08 135 A1 | 9/1989 |
| DE | 39 14 003 A1 | 10/1990 |
| DE | 41 35 749 A1 | 5/1992 |
| DE | 42 35 872 C2 | 4/1994 |
| DE | 44 33 013 A1 | 3/1996 |

OTHER PUBLICATIONS

Luedtke, Wolfgang, "Kooperation", MM–Magazin Schleswig–Holstein 1997, pp. 14–16.
Niclas, Christian and Barelmann, Dieter, "Die SPS im PC–Zeitalter", etz vol. 22, 1997, pp. 6,7.
Melder, Wilfried and Mueller, Ralf, "PC und SPS Kombinieren . . . ", etz vol. 22, 1997, pp. 8, 11.
Wenk, Mathias, "Verdraengt der PC die SPS?", Technica Mar. 1998, pp. 12–15.
Elmar Flaschka, "Binaere Sensoren am Bus", Elektronik Dec. 1994, pp. 64–68.

*Primary Examiner*—John Follansbee
*Assistant Examiner*—Ronald D Hartman, Jr.
(74) *Attorney, Agent, or Firm*—Sughrue Mion, PLLC

(57) ABSTRACT

A control system including a personal computer (1) for controlling a process. The personal computer (1) includes a communications processor (14), which is connected to a field bus (2). Sensors (3, 4) and/or actuators (5, 6) are connected to the field bus (2). A monitoring unit (16) monitors a cyclic data transmission on the field bus (2). The monitoring unit (16) also causes a PC processor (7) to process data received at the field bus (2) by means of a control program, if at least one predetermined condition is met, e.g., a change in the process data. Thereby, the PC processor (7) is relieved of the burden of continuously polling the process data. The process data are stored in a memory (15). The control system is used, in particular, in communications processors for personal computers.

11 Claims, 1 Drawing Sheet

CONTROL SYSTEM HAVING A PERSONAL COMPUTER TO CONTROL A PROCESS

This is a Continuation of International Application PCT/DE99/02143, with an international filing date of Jul. 13, 1999, which was published under PCT Article 21(2) in German, and the disclosure of which is incorporated into this application by reference.

FIELD OF AND BACKGROUND OF THE INVENTION

The present invention relates to a control system that includes a personal computer.

German Laid-Open publication DE 38 08 135 discloses a control system including a personal computer (PC). The PC includes a PC-processor, a data memory, a freely programmable memory for a user program, and a communications processor. These individual components are connected to one another via a PC bus, which has address lines, data lines and control lines. The communications processor is designed as a module, which is plugged into one of the PC slots. In addition to the communications processor, which can independently transmit cyclic data to a field bus, a stored programmable control unit (SPC) is realized on the plug-in module. Therein, the circuit is arranged in such a way that a program for controlling a process is executed either by the PC processor or by a processor of the SPC. This process is controlled via sensors and/or actuators that are connected to the field bus.

A first operating mode of the control system, in which the control program runs on the PC processor, has the advantage that the processing of information and the control of the process are not dependent on a specific SPC language, such as a "coupling plan" (COP) or "instruction list" (IL). Instead, the control program is written in any standard language, such as PASCAL, C, or BASIC. The system is therefore more user friendly and additional applications of the control system are made available. It is, however, a downside of this first operating mode that the control program and the polling of data received on the field bus increase the load on the PC processor. Since the PC processor is required to perform other tasks, such as keyboard queries, display functions, process data analysis and process data visualization, the available resources are inevitably overloaded. Specifically, the PC processor load is significantly increased if the control system controls a time critical process during which the process data must be read in very short time intervals in order to detect time critical changes in the process.

A second operating mode of the control system, in which an SPC runs the control program independently of the PC processor, has the advantage that the SPS processor is not burdened by any additional tasks. Instead, the SPC processor is provided for control tasks only. By the same token, the PC processor does not have to perform these control tasks. However, it is a drawback of this second operating mode that the control program must be written in a specific programming language tailored to stored programmable controls.

OBJECTS OF THE INVENTION

It is one object of the present invention to provide a control system including a personal computer (PC), in which the PC processor assumes the task of running the control program, yet wherein the PC processor is burdened by this control task to a lesser extent than previously achieved in the prior art.

SUMMARY OF THE INVENTION

This and other objects of the present invention are achieved by a control system to control a process, wherein the control system includes a field bus, a personal computer, and a monitoring unit. The field bus is coupled to sensors and actuators and receives process data from the process to be controlled. The personal computer executes a control program for controlling the process and includes a personal computer processor, a data memory, a program memory, and a communications processor. The communications processor is coupled to the field bus and performs independently a cyclic transmission of the process data on the field bus. The monitoring unit monitors the process data received at the field bus and/or the cyclic transmission of the process data on the field bus. In addition, the monitoring unit causes the personal computer processor to run the control program in order to process the process data received at the field bus, if at least one predetermined condition is met.

It is an advantage of the present invention that control programs written for a control system operating in the first operating mode, in which the control programs are executed on the PC processor, can be transferred onto the new control system without any major changes. Therein, the PC processor is relieved from polling received process data or from monitoring a field bus cycle. These tasks are advantageously assumed by the monitoring unit. The monitoring unit can be advantageously realized by a parameter-driven hardware circuit. Alternatively, a software solution is possible by enhancing a program of the communications processor accordingly.

In any case, a fast detection of events, e.g., changes of the process data, is achieved. The control program is activated only if the process data have actually changed. Advantageously, specific conditions are predetermined for each subscriber connected to the field bus, e.g., a sensor or an actuator. The monitoring unit checks whether these conditions are met. Therefore, the control method according to the present invention allows for a flexible classification of the subscribers. In addition, the load on the PC processor is scaleable. The overall load on the PC processor is reduced so that the PC processor is more frequently available for other applications. Thereby, the control system reacts to changing process data with a minimal time delay, which is an important functional requirement for the control system.

If the monitoring unit causes the PC processor to generate an interrupt command in order to process received data, a standard technique is advantageously used to activate the control program with a minimal time delay.

If a predetermined cycle event occurs, the processing of received data in the control program is advantageously synchronized with the field bus cycle. This cycle event represents a predetermined condition, which is to be met while the cyclical data transmission on the field bus is monitored. This concept is especially advantageous if the predetermined cycle event is "the completion of a cycle", or if a constant scanning time is desired in case a scanning control is used.

If the monitoring unit monitors whether or not a message regarding errors in the subscribers of the control system has been received, a fast reaction to these errors is achieved. As noted above, the subscribers are connected to the field bus.

Furthermore, the received process data can be checked in order to determine whether they exceed a predefined value range. Thereby, the PC processor can quickly initiate appropriate measures.

If the communications processor stores the received process data in a memory that can be accessed by the PC processor, a current representation of the process is constantly available in order to run the control program and in order to perform visualization tasks. The memory can be designed in such a way that the stored data are accessed by both the PC processor and the communications processor. This approach has the advantage that the communications processor can handle the field bus cycle independently of the PC processor's retrievals of process data. The duration of the field bus cycle is therefore not influenced by the number of the PC processor's data retrievals.

Advantageously, the control program causes the PC processor to process the data received at the field bus only if the process data have changed. The monitoring unit indicates such a change in the process data, if the received process data deviate from the process data stored in the memory. This is especially advantageous in processes which exhibit low dynamics, since an unnecessary load of the PC processor is thus avoided.

The new control system is especially advantageous if the communications processor is operated as a "master", which is connected to a field bus of the PROFIBUS DP type. Such a field bus is designed for cyclical data transmission. The communications processor, which operates as the master, determines the field bus cycle and functions as a "clock provider" for detecting the process data. The duration of a field bus cycle, which corresponds to the scanning period during regulation, is independent of other subscribers, which are connected to the field bus and operated as "slaves".

BRIEF DESCRIPTION OF THE DRAWINGS

The invention and further advantageous refinements of the invention according to the features of the dependent claims are explained in more detail below with the aid of a diagrammatic, exemplary embodiment in the single drawing.

DETAILED DESCRIPTION OF THE PREFERRED EMBODIMENTS

Figure 1:
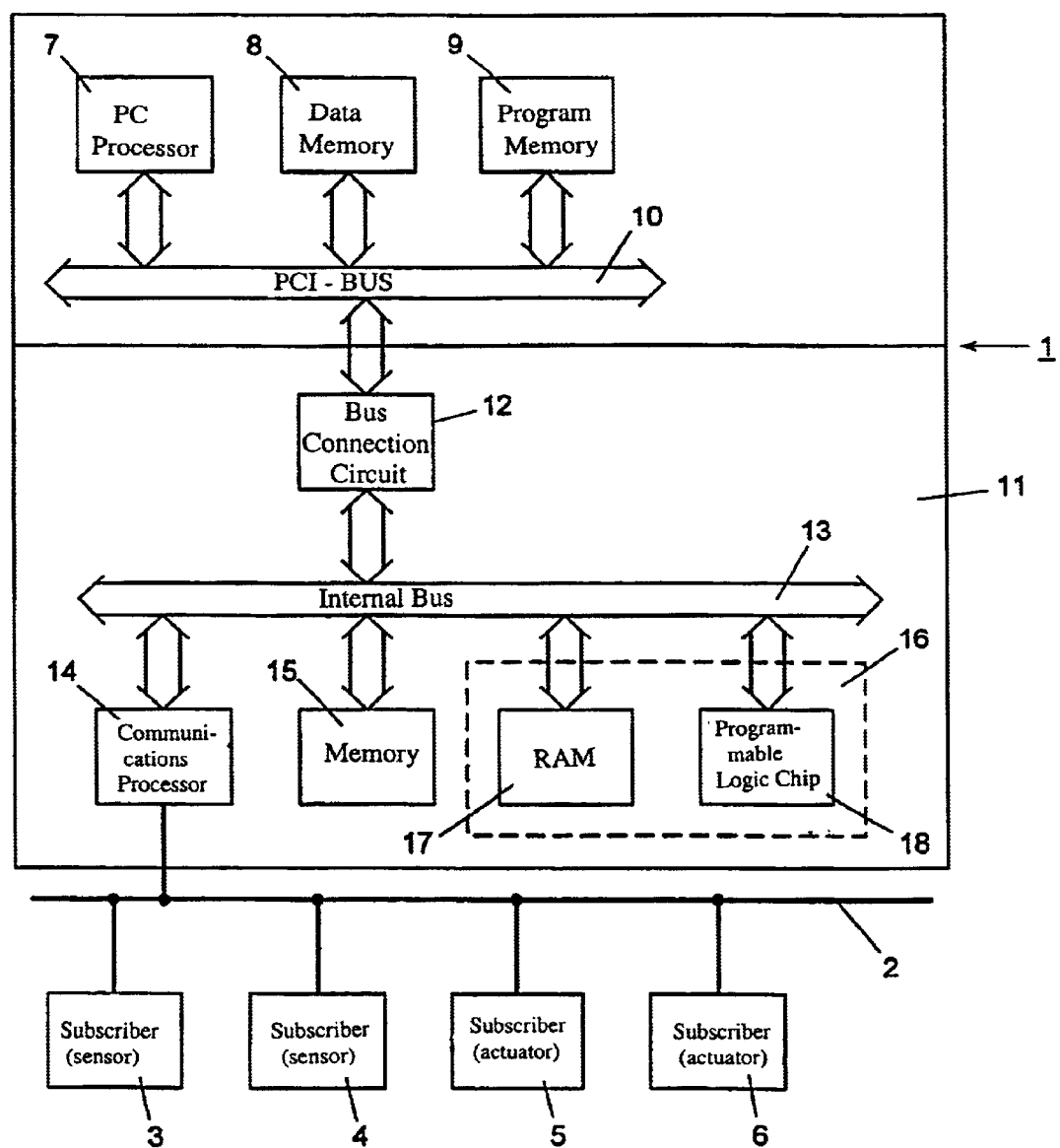

The figure shows a personal computer 1, which is interconnected to subscribers 3, 4, 5 and 6 via a field bus 2, in particular a PROFIBUS DP. The PROFIBUS DP functions in accordance with the master/slave access principle. "Slaves" are subscribers connected to the bus system that send data via the bus only if they are asked to do so by the "master". The master is the personal computer 1. The subscribers 3 and 4 are sensors, for example flow measuring transformers or level measuring transformers. The subscribers 5 and 6 are actuators, for example in-flow valves or a drain valves, on a tank whose filling is to be regulated as a process. The field bus 2 is designed for cyclic data transmission. The master, here the personal computer 1, allows for a strict time-cyclic transfer of reference data between the master and slaves. That is, the field bus cycle is kept as constant as possible, regardless of the status of the slaves at the bus. Using the PROFIBUS DP, the data exchange between the master 1 and a slave takes less than 0.5 ms. Thus, for the preferred embodiment shown, a field bus cycle takes less than 2 ms. In order to immediately recognize any changes in the process data, PC processor 7 would therefore have to check and evaluate the process data 0.5 ms at the latest after they have been received at the field bus 2. This would, however, lead to a considerable load on the PC processor, since a task change, such as a change from a visualization program to a control program for the process, is associated with a considerable amount of administrative processing. The control system shown in the FIGURE reduces this load on the PC processor.

The personal computer (PC) 1 used for the new control system is a conventional computer, especially an industrial PC, which includes at least a PC processor 7, a data memory 8, and a program memory 9. These components are interconnected via an internal PCI bus 10, which includes data lines, control lines, and address lines. A plug-in card 11, which is connected to the PCI bus 10, is plugged into PC 1 in order to facilitate communication on the field bus 2. The PC processor 7 communicates with the components of the plug-in card 11 via a PCI bus connection circuit 12 and via an internal bus 13. A communications processor 14 is arranged on the plug-in card 11. After proper parameterization of the communications processor 14 by the PC processor 7, the communications processor 14 initiates independently a cyclic data transmission or cyclic data transfer on the field bus 2. The communications processor 14 includes an ASIC, which is designated as an ASPC2 from Siemens. During the start-up of the control system, the ASPC2 is parameterized by concatenated task blocks according to the respective configuration of the field bus 2. A memory 15, in which the process data received at the field bus 2 are stored, is also provided. This memory 15 thus contains a current image or representation of the process, which can be accessed by the PC processor 7 at anytime. As the memory 15, an SSRAM component of the size 32 k×32 is used. The SSRAM component includes a bus driver circuit, which is not shown in the FIGURE. A monitoring unit 16 includes a small RAM 17, which is incorporated into an address area of the PC processor 7. Therefore, the small RAM 17 can be directly addressed by the PC processor 7. The monitoring unit 16 also includes a programmable logical chip 18, which monitors, in accordance with a parameterization stored in the RAM 17, the cyclic data transfer on the field bus 2 and/or the data received at the field bus 2. An EPLD of the type 7256 from Altera is used as the logical component 18.

When the control program is started in the program memory 9, the PC processor 7 accesses the RAM 17 and sets the appropriate bits there to ensure the desired function of the monitoring unit 16. This parameterization determines, for example, in which specific cases the monitoring unit 16 should generate an interrupt that will be transmitted to the PC processor 7 via the PCI bus connection circuit 12 and the PCI bus 10.

That is, the specific events are determined, for which the PC processor 7 is to be directed by the control program to process data received at the field bus 2. The following is a list of examples of such specific events:

All slaves were accessed once, i.e., one field bus cycle is completed;

a slave on the field bus provides changed process data;

a slave reports an abnormal situation or an error; and/or a slave provides process data that lie outside a predetermined value range.

The parameterization is capable of determining for each separate slave on the field bus 2 whether or not interrupts should be generated when the respective process data change.

In an active process control, the communications processor 14, which functions as the master, continuously polls the subscribers 3 . . . 6 on the field bus 2. Therein, the subscribers 3 . . . 6 are operated as slaves. If the communication process 14 reads the process data of a slave, the communications processor 14 writes the data into those storage cells of the memory 15 that are provided for the respective process data. The logical component 18 of the monitoring unit 16 checks by means of the address of the writing access, whether an interrupt must be generated in case the respective process data have changed. This monitoring process is simple since the process data of the individual slaves are stored in respective fixed storage areas within the memory 15. If an interrupt is to be generated due to a change in the respective process data, a data comparator arranged in the logical chip 18 compares the current process data transmitted on the bus 13 with former process data, which were previously retrieved from the memory 15 by the logical chip 18. Therein, the transmission of the current process data on the bus 13 is initiated by the communication processor 14.

If the pre-determined condition "data change" is met, the logical chip 18 generates an interrupt that is transmitted to the PC processor 7, in order to cause the control program to process the current data received at the field bus 2. At the same time, the communications processor 14 overwrites the former process data in the memory 15 with the new data or current data received at the field bus 2. When an interrupt is generated, a flag is set within the logical chip 18. This flag indicates that the logical chip 18 has generated an interrupt for the current data block in the memory 15. The function of this flag is to prevent generating multiple interrupts when process data have changed at several positions in the same current data block transmitted by the same slave during the cyclic data transmission. The flag is reset when the communications processor 14 accesses addresses in the memory 15 under which the process data of the next slave in the field bus cycle are stored.

Since comparing the currently received process data with the previous process data and generating the interrupts are carried out by a monitoring unit that is designed as a hardware component (namely monitoring unit 16), a very fast reaction of the control system to process data changes is advantageously achieved.

If the communications processor 14 retrieves process data from the memory 15 in order to forward them to one of the actuators 5 or 6 via the field bus 2, the monitoring unit 16 does not generate an interrupt command. These retrieved process data were previously calculated by the PC-processor 7, which also wrote them into the memory 15.

The above description of the preferred embodiments has been given by way of example. From the disclosure given, those skilled in the art will not only understand the present invention and its attendant advantages, but will also find apparent various changes and modifications to the structures disclosed. It is sought, therefore, to cover all such changes and modifications as fall within the spirit and scope of the invention, as defined by the appended claims, and equivalents thereof.

What is claimed is:

1. A control system for controlling a process, comprising:
   a field bus coupled to at least one of a sensor and an actuator, wherein the field bus is configured to receive process data;
   a personal computer to execute a control program, the personal computer comprising:
   a personal computer processor;
   a data memory;
   a program memory; and
   a communications processor coupled to the field bus and configured to independently perform a cyclic transmission of the process data on the field bus; and
   a monitoring unit configured to monitor at least one of the process data received at the field bus and the cyclic transmission of the process data on the field bus, and configured to cause the personal computer processor to process, by means of the control program, the process data received at the field bus upon occurrence of at least one predetermined condition.

2. The control system of claim 1, wherein the monitoring unit is configured to generate an interrupt command in order to cause the personal computer processor to process the process data received at the field bus.

3. The control system of claim 1, wherein the predetermined condition comprises an achievement of a predetermined event in a cycle of the cyclic transmission of the process data.

4. The control system of claim 3, wherein the predetermined event comprises a completion of the cycle.

5. The control system of claim 1, wherein the predetermined condition comprises a reception of an error message.

6. The control system of claim 1, wherein the predetermined condition comprises exceeding a predetermined value range for the process data received at the field bus.

7. The control system of claim 1, further comprising a memory, which stores the process data received at the field bus.

8. The control system of claim 7, wherein the memory is configured to be accessed by at least one of the personal computer processor and the communications processor.

9. The control system of claim 8, wherein the memory is configured to be accessed by both the personal computer processor and the communications processor.

10. The control system of claim 7, wherein the predetermined condition comprises an deviation of the process data currently received at the field bus from the process data previously stored in the memory.

11. The control system of claim 1, wherein the communications processor is configured to be operated as a master, and wherein the field bus comprises a PROFIBUS DP field bus.

\* \* \* \* \*